Nov. 30, 1965  A. KALENIAN  3,221,237
SERIES CAPACITOR IN D.C. MOTOR CONTROL SYSTEM
Filed Oct. 16, 1961  3 Sheets-Sheet 1

*INVENTOR.*
ARAM KALENIAN
BY Fenway, Jenney & Hildreth

ATTORNEYS

*INVENTOR.*
ARAM KALENIAN

ATTORNEYS

United States Patent Office 3,221,237
Patented Nov. 30, 1965

3,221,237
SERIES CAPACITOR IN D.C. MOTOR
CONTROL SYSTEM
Aram Kalenian, 7 Weld St., Westboro, Mass.
Filed Oct. 16, 1961, Ser. No. 145,366
4 Claims. (Cl. 318—347)

The present invention relates to electric motor controllers and more particularly to controllers which give a substantial negative slope in their speed-torque or speed-current characteristic.

One object of the invention is to provide an electric motor controller giving a considerable negative slope in the motor characteristic, and also to provide means whereby the characteristic may be conveniently varied.

Another object is to provide such a controller in which the electrical losses are negligible.

Another object is to provide a simple and reliable bidirectional servomotor controller.

A further object is to provide a controller having a substantially linear speed-torque characteristic, especially useful in a system for precisely controlling the tension in a winding apparatus.

With these objects in view the present invention comprises certain novel features of circuit arrangements and combinations and arrangements of parts, hereinafter described and particularly defined in the claims.

In the accompanying drawings FIG. 1 is a diagram of a motor circuit according to the preferred form of the present invention;

Figure 1:
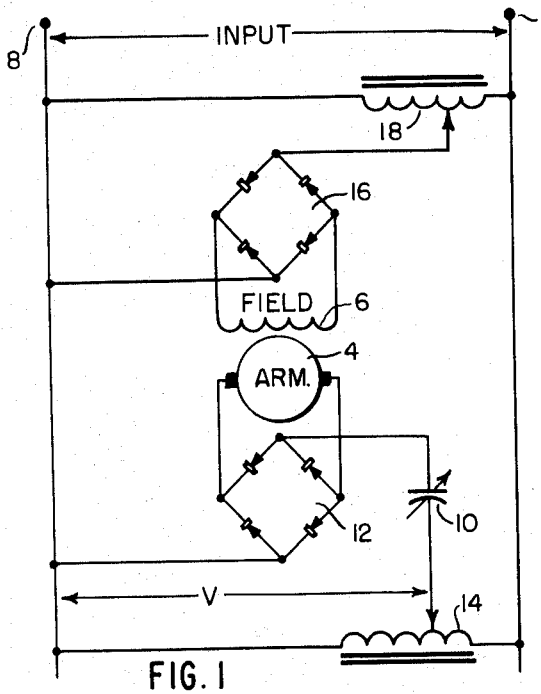

The preferred form of the invention as shown in FIG. 1 comprises a direct current motor having an armature circuit including armature 4 and a field winding 6. The armature is energized from an alternating current source 8, a condenser 10 and a rectifier 12, which is here shown as being of the bridge type. For some uses a constant line voltage from the source 8 will be impressed on the armature circuit, but the invention contemplates the use of a variable transformer 14 shown as a variable autotransformer whereby the direct current voltage on the armature of the motor may be varied.

The field circuit is energized from the source 8 and comprises the field winding and a rectifier 16, also shown as of the bridge type. For varying the field current a transformer shown as an autotransformer 18 may be used.

The condenser 10 is preferably variable. Although the condenser is shown as being of the continuously variable type, it can also be of a form variable in steps.

The invention will first be described by referring to the motor characteristics shown in FIG. 2. These characteristics are for a typical one-horsepower motor with 115 volts 60 cycle constant input. The range of condenser variation is from 75 to 300 microfarads.

Figure 2:
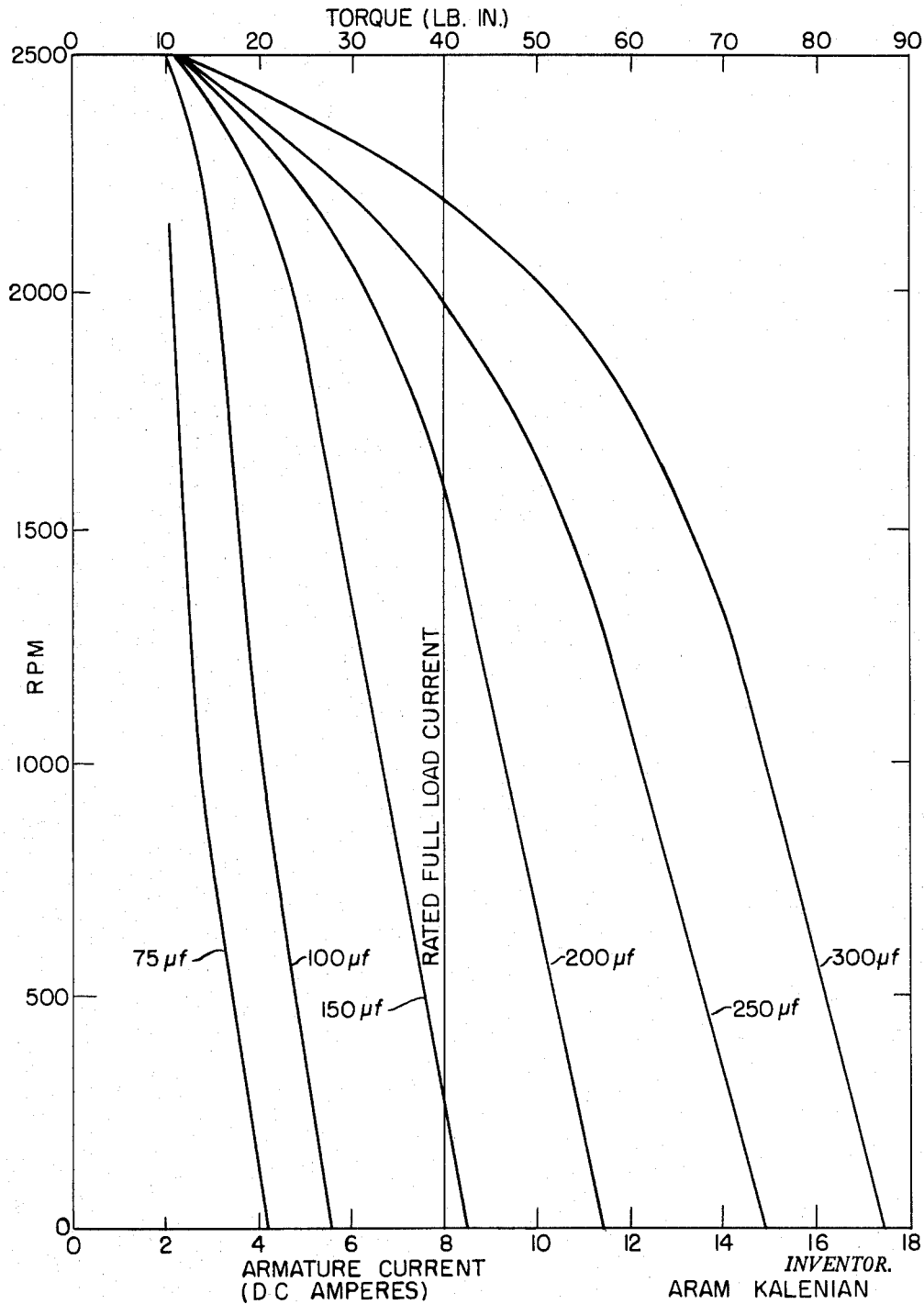
FIG. 2 is a graph of the characteristics of one form of motor according to the present invention.

It will be observed from FIG. 2 that there is a considerable negative slope in the characteristics, which may be viewed either as speed-torque characteristics or speed-current characteristics. Each of the characteristic curves approaches linearity over a considerable part of its range, especially at the higher current values. The negative slope and linearity of the characteristics are particularly useful in winding machines for tape, yarn, fabric, paper, etc. or for the spooling of wire, because as the spool or reel diameter increases the torque automatically increases to hold nearly constant tension on the material being wound. The motor speed also drops and causes the winding operation to proceed at a substantially constant linear rate.

Considering the characteristics shown for 300 microfarads capacitance in the condenser 10, this runs from a no-load current of 2 amperes to a stalled current of slightly more than twice rated full-load current. Upon reduction of the capacitance to 250 microfarads a steeper characteristic is obtained. With diminishing values of capacitance, especially for 200 microfarads, 150 microfarads and 100 microfarads, the characteristics are nearly parallel and are linear over a long range. For example, with 150 microfarads in circuit the motor stalls with a current of only slightly more than the rated full-load current. These values of capacitance are in the most useful range of operation of the motor. On further reduction of the capacitance to 75 microfarads a moderately linear curve with large negative slope is obtained, but the motor will not get up to its rated speed of 2500 r.p.m.

Figure 3:
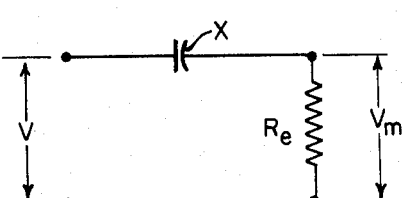
FIGS. 3, 4, 5 and 6 are diagrams explanatory of the operation of the controller.

The operation is explained in conjunction with FIGS. 3 to 6 as follows: The equivalent circuit may be considered as shown in FIG. 3 wherein the rectifier-motor armature circuit may be though of as a resistor $R_e$. This is on the assumption that the A.C. side sees the rectifier and load as a non-reactive circuit, an assumption justified by the natural filtering action of the load. It will also be assumed that the voltages and currents are sine waves.

The voltage $V_m$ across the motor armature, as seen from the A.C. side, is $IR_e$. This voltage $V_m$ may be taken as the A.C. voltage across the rectifier input terminals if the resistance of the rectifier is neglected. Hence the value of $R_e$ is determined by the motor load. Under the assumptions made above $V_m$ may also be taken as the rectified equivalent of the D.C. voltage across the motor armature. Then $V_m = E + IR_a$, where E is the counter E.M.F. of the motor and $R_a$ is actual resistance of the motor armature circuit. I may be the value of either the alternating or direct current, depending on whether the A.C. or D.C. side of the rectifier is being considered.

Figure 4:
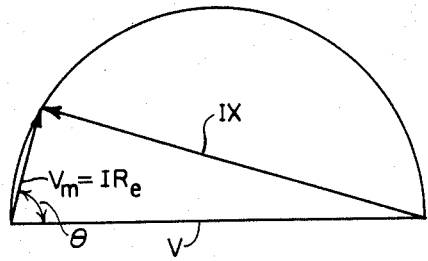
Figure 5:
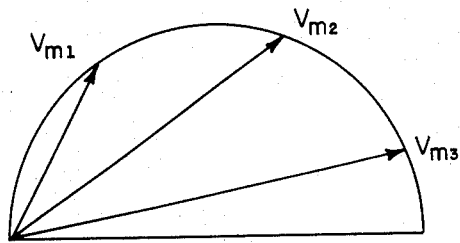

The conditions existing on the A.C. side may be represented by the vector diagram of FIG. 4, wherein $IR_e$ represents the voltage across the armature circuit and IX the voltage across the capacitor. Since these voltages are in quadrature their vector sum is the constant input voltage V. If the input voltage and the condenser reactance are held constant and $R_e$ is varied, corresponding to variations in load, the vector $IR_e$ will trace a semicircular locus. Therefore the armature voltage $V_m$ (which equals $IR_e$) traces a semi-circular locus upon variations of load. In FIG. 5, three values of $V_m$ are shown, namely $V_{m1}$ corresponding to light load, $V_{m2}$ corresponding to an intermediate load and $V_{m3}$ corresponding to a heavy load or practically stalled condition.

Figure 6:
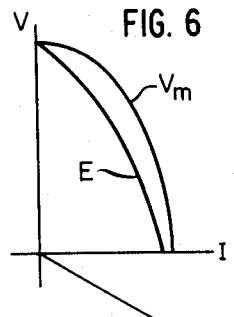

The corresponding values of armature current are readily determined. Since X is assumed to be constant, the armature current is proportional to the drop across the capacitive reactance but its direction is along the $V_m$ vector. Therefore $V_m$ varies as the cosine of the parametric angle $\theta$, while I varies as the sine of the same angle. The relationship between $V_m$ and I is theoretically an ellipse. The elliptical characteristic is drawn in FIG. 6. From the D.C. relation $V_m = E + IR_a$, the relationship between E and I is readily obtained by subtracting $IR_a$ from $V_m$, as shown in FIG. 6. Since E is directly proportional to motor speed, the curve labelled E in FIG. 6 is the speed-current or speed-torque characteristic of the motor for a constant value of capacitance. This curve corresponds to one of the characteristic curves of FIG. 2, justifying the asumptions made in the foregoing explanation. Each of the characteristic curves of FIG. 2 is for the condition of varying load with constant capacitance. If the capacitance is varied, the operation is transferred to a different characteristic. As shown in FIG. 2, the curves become steeper as the capacitance is reduced, but along any characteristic a substantial range of linearity is attained.

The operation may also be changed by varying the voltage V, as by the use of the autotransformer 14. Similar negative-slope characteristics are obtained, except that for any given value of capacitance the curves become less steep as the voltage is reduced.

Figure 7:
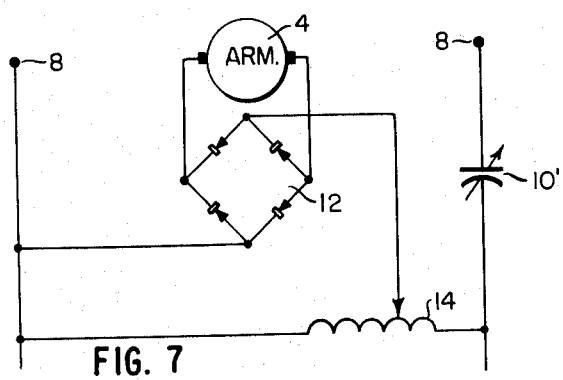
FIG. 7 is a diagram of a modified circuit.

As shown in FIG. 7, the condenser 10' may be placed on the primary side instead of the secondary side of the autotransformer 14. When the transformation ratio is changed a dual effect is produced, due to the change of voltage and also to the change of effective value of the capacitance. Thus, if the ratio of secondary to primary voltage is reduced, there is obtained not only a flattening of the curve through this voltage change, but the effective capacitance as seen from the second side is increased, thereby producing a further flattening of the curve. By this means, a considerable change in the characteristic may be obtained, even with the use of a fixed capacitor.

The motor as above described has certain advantages, of which the following may be noted. It is virtually burn-out proof as indicated by the fact that even with the maximum capacitance the current at stalled condition is only about twice the rated full-load current.

The efficiency is very high since there is only a small loss due to the rectifier and a negligible loss due to the power factor of the condenser 10. The motor even under a very light connected load will not run away if there is an accidental loss of field, because the voltage across the armature is rapidly reduced as the motor tends to run to excessive speeds.

Another advantage is that a short-circuit across the armature terminals will cause no damage since the reactance of the condenser protects against excessive current flows.

Figure 8:
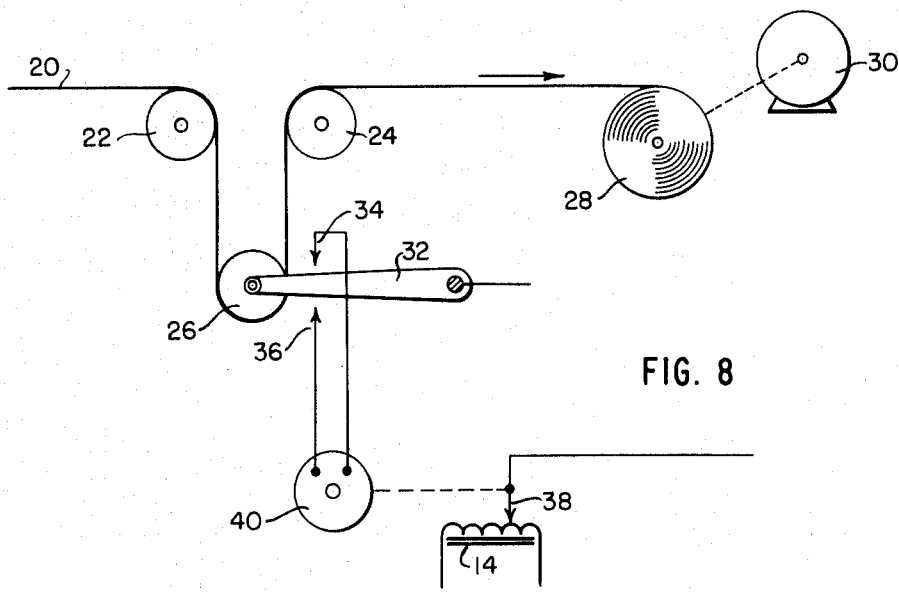
FIG. 8 is a diagram of an apparatus for precise control of a winding operation to produce substantially constant winding tension.

FIG. 8 is a diagram of a preferred system for very precise control of tension in a winding operation. The thread, wire or sheet which is to be wound is shown at 20 passing over fixed rolls 22 and 24 between which is an idler or "dancer" roll 26 mounted to rise or fall as the tension varies. The material is wound on a take-up reel or spool 28 driven by a motor 30 of the present invention. The dancer roll 26 is mounted on a pivoted yoke 32 adapted to close either one of two switches 34 and 36 as the roll rises or falls in response to changes in tension. The switches 34 and 36 are connected to a motorized contact 38 on the autotransformer 14, the contact 38 being driven in one direction or another by a small motor 40 depending on which of the switches 34 and 36 is actuated. The take-up motor 30 is provided with field and armature energizing circuits as shown in FIG. 1, only the autotransformer 14 of said figure being illustrated in FIG. 8.

Assuming operation under normal conditions along one of the characteristics of FIG. 2, say the characteristic based on the 150 microfarad capacitance, the parts may be adjusted so the yoke 32 tends to assume a neutral position between the switches 34 and 36 under constant tension conditions. If the tension increases the yoke 36 is lifted thereby, closing switch 34 and driving the motor 40 to move the tap 38 in a direction to decrease the voltage on the armature circuit. This reduces the energy supplied to the motor 30 and thereby reduces the tension to a point where a new balance is attained.

The use of the idler roll control with the capacitive armature circuit controller produces an advantageous result as compared with the control circuit alone, since it is well known that such a control circuit operating with a standard motor tends to hunt, so that the switches are being continually operated. According to the present invention the roll assumes a neutral position with respect to the switches for relatively long periods, and one of the other switches will therefore operate only at infrequent intervals. Viewed in another way, there is a characteristic curve, which, if it were precisely linear, would allow the winding operation to continue indefinitely with constant tension, assuming that the operation was started under conditions consistent with operation on that curve. Since no characteristic is exactly linear and there are unavoidable variations in the material being wound, as well as random variations in other parts of the system, the winding tension will tend to change after a time. When a change occurs which is sufficient to actuate one of the switches, it causes the operation to shift to a slightly different characteristic, which also has nearly linear properties so that the operation can continue smoothly before the next actuation of a switch.

Figure 9:
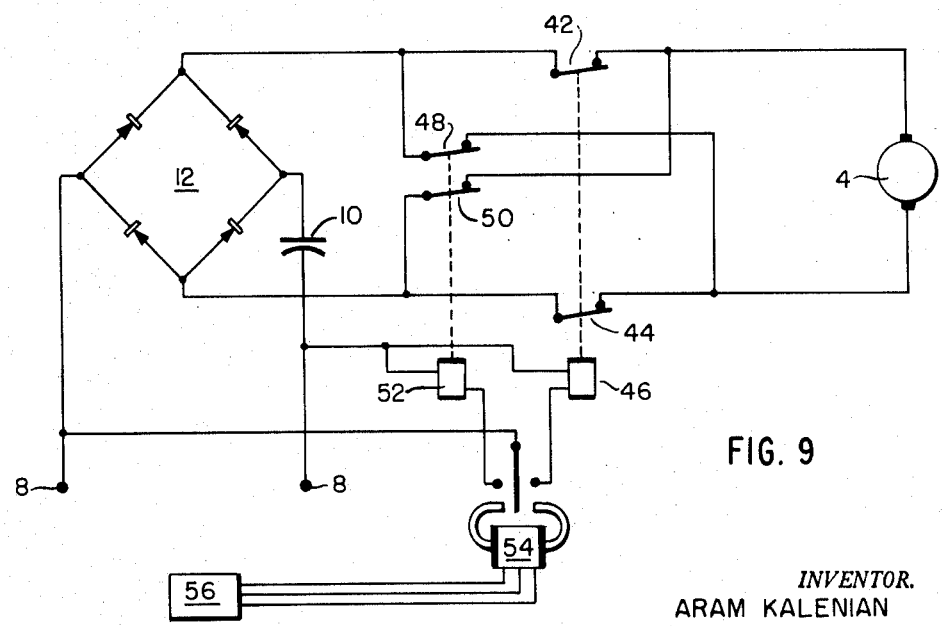
FIG. 9 is a diagram is a servomotor controller according to the present invention.

By the use of suitable reversing switches the direction of rotation may be altered at will, as will be clear to those skilled in the art. These attributes make the system especially suitable as a closed loop bi-directional servo motor controller arranged to operate directly from an alternating current power supply. Thus, in FIG. 9, the rectifier 12 is connected to the armature 4 by the normally-closed contacts 42 and 44 of relay 46 for forward rotation, and by the normally-closed contacts 48 and 50 of relay 52 for rotation in reverse direction. Forward rotation of the armature is provided by energizing relay 52 to open contacts 48 and 50, while reverse rotation results upon energizing relay 46 to open contacts 42 and 44. When both sets of contacts are closed, the rectifier output is short-circuited through the relay contacts and the armature receives no power. The rectifier is protected against damage by the capacitor 10, as hereinbefore explained. The armature is likewise shorted when both sets of relay contacts close, which serves to bring the armature quickly to rest as soon as excitation is removed.

For sensitive servo operation, relays 46 and 52 may be under the control of a polarized amplifier relay 54 of the three-position null-center type. Actuation of the relay amplifier to one side or the other of its null position may be effected at low power levels by a transducer 56 responsive to the error signal.

While this reversible motor control has been described in terms of normally closed relay contacts, one set or the other of which is opened to actuate the motor, it is evident that for applications where it is desired to eliminate the standby current, the relays may have normally-open contacts, one set or the other of which is closed to energize the armature. Such arrangement lacks the dynamic breaking characteristic provided by the shortened armature when stopping.

Having thus described the invention, I claim:

1. In a motor control circuit the combination of a direct current motor armature, and in series connection therewith a condenser and a rectifier, and an alternating current source for the circuit, the condenser having an impedance to impart a substantial negative slope to the speed-load characteristic.

2. The combination of claim 1, in which the condenser is variable.

3. The combination of claim 1, in combination with a variable transformer for varying the voltage of the source.

4. The combination of claim 3, in which the condenser is on the primary side of the transformer.

References Cited by the Examiner

UNITED STATES PATENTS

| 1,508,138 | 9/1924 | Foote | 318—293 |
| 2,583,153 | 1/1952 | Osbon | 318—6 |
| 3,001,120 | 9/1961 | Beriskin | 321—24 |

ORIS L. RADER, Primary Examiner.

JOHN F. COUCH, Examiner.